United States Patent [19]
Schwarz

[11] 3,825,301
[45] *July 23, 1974

[54] HEAD AND NECK REST

[76] Inventor: Bernhard Schwarz, 11 Eichenstrassa, Muri, Bern, Switzerland

[ * ] Notice: The portion of the term of this patent subsequent to Mar. 28, 1989, has been disclaimed.

[22] Filed: Jan. 10, 1972

[21] Appl. No.: 216,454

Related U.S. Application Data
[63] Continuation-in-part of Ser. No. 4,346, Jan. 20, 1970, Pat. No. 3,652,128.

[30] Foreign Application Priority Data

| Jan. 23, 1969 | Switzerland | 1155/69 |
| July 12, 1969 | Switzerland | 10710/69 |
| Aug. 29, 1969 | Switzerland | 13298/69 |
| Jan. 21, 1970 | Germany | 2002566 |

[52] U.S. Cl. .............................................. 297/408
[51] Int. Cl. .................................................. A47c 7/36
[58] Field of Search .......... 297/397, 406, 405, 408, 297/409, 404, 216; 248/391, 181; 287/14

[56] References Cited
UNITED STATES PATENTS

| 246,169 | 8/1881 | Manley | 287/DIG. 3 |
| 619,272 | 2/1899 | Browne | 297/409 |
| 856,025 | 6/1907 | Brown | 297/400 |
| 1,104,834 | 7/1914 | Schneider | 287/14 X |
| 1,107,241 | 8/1914 | Aalborg | 287/14 |
| 2,586,417 | 2/1952 | Cole | 297/409 |
| 2,661,050 | 12/1953 | Felter | 297/391 |
| 2,697,577 | 12/1954 | Wolf | 287/14 X |
| 2,746,414 | 5/1956 | Roberts | 287/DIG. 3 |
| 2,760,559 | 8/1956 | Hustin | 297/408 |
| 2,775,424 | 2/1956 | Harris | 287/14 X |
| 2,802,633 | 8/1957 | Moore | 287/14 X |
| 2,973,029 | 2/1961 | Schlosstein | 297/404 X |
| 3,231,308 | 1/1966 | Redfield | 297/410 |
| 3,360,286 | 12/1967 | Smyth | 287/14 |
| 3,650,561 | 3/1972 | Faust | 297/391 |
| 3,652,128 | 3/1972 | Schwarz | 297/408 |

FOREIGN PATENTS OR APPLICATIONS

| 2,002,556 | 7/1970 | Germany | 297/391 |

*Primary Examiner*—Paul R. Gilliam
*Assistant Examiner*—G. Moore
*Attorney, Agent, or Firm*—Littlepage, Quaintance, Murphy & Dobyns

[57] ABSTRACT

A head and neck rest for vehicle seats comprises a head piece secured to a supporting rod which is mounted by the intermediary of an articulated joint on a saddle member on the back rest of a seat. The joint allows a backwards tilting movement of the supporting rod to which is secured the head piece. Movable and stationary axially aligned joint members are axially traversed by a clamping rod for exerting a predetermined clamping force on the movable member of the joint by the stationary members and causing the movable joint member carrying the head piece to resist a tilting movement due to the action of a shock received by the head or neck of a passenger using the seat of a vehicle.

8 Claims, 5 Drawing Figures

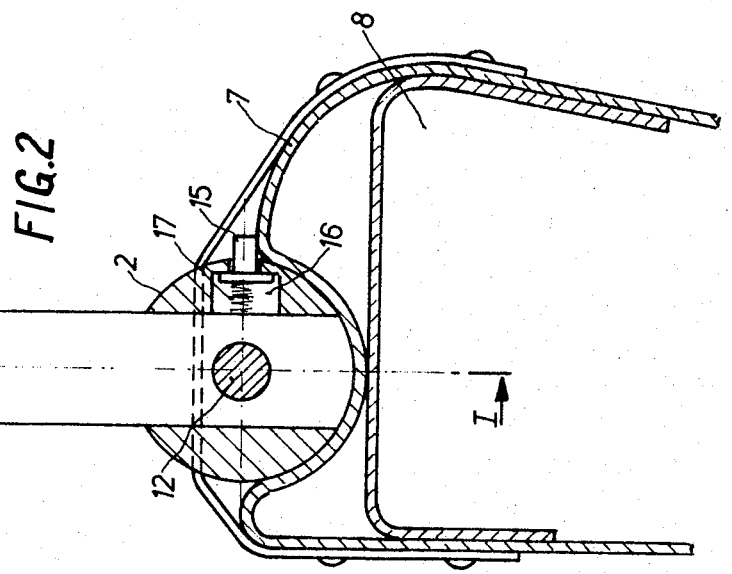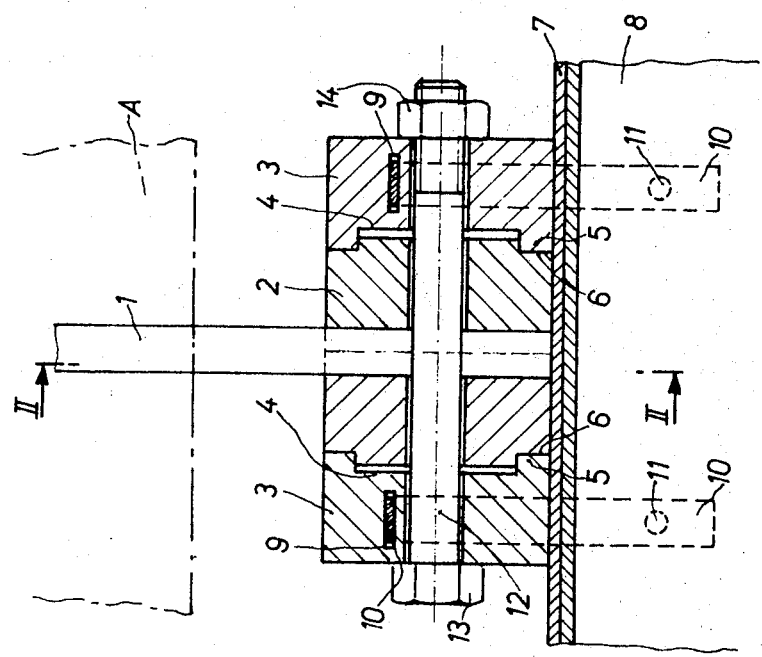

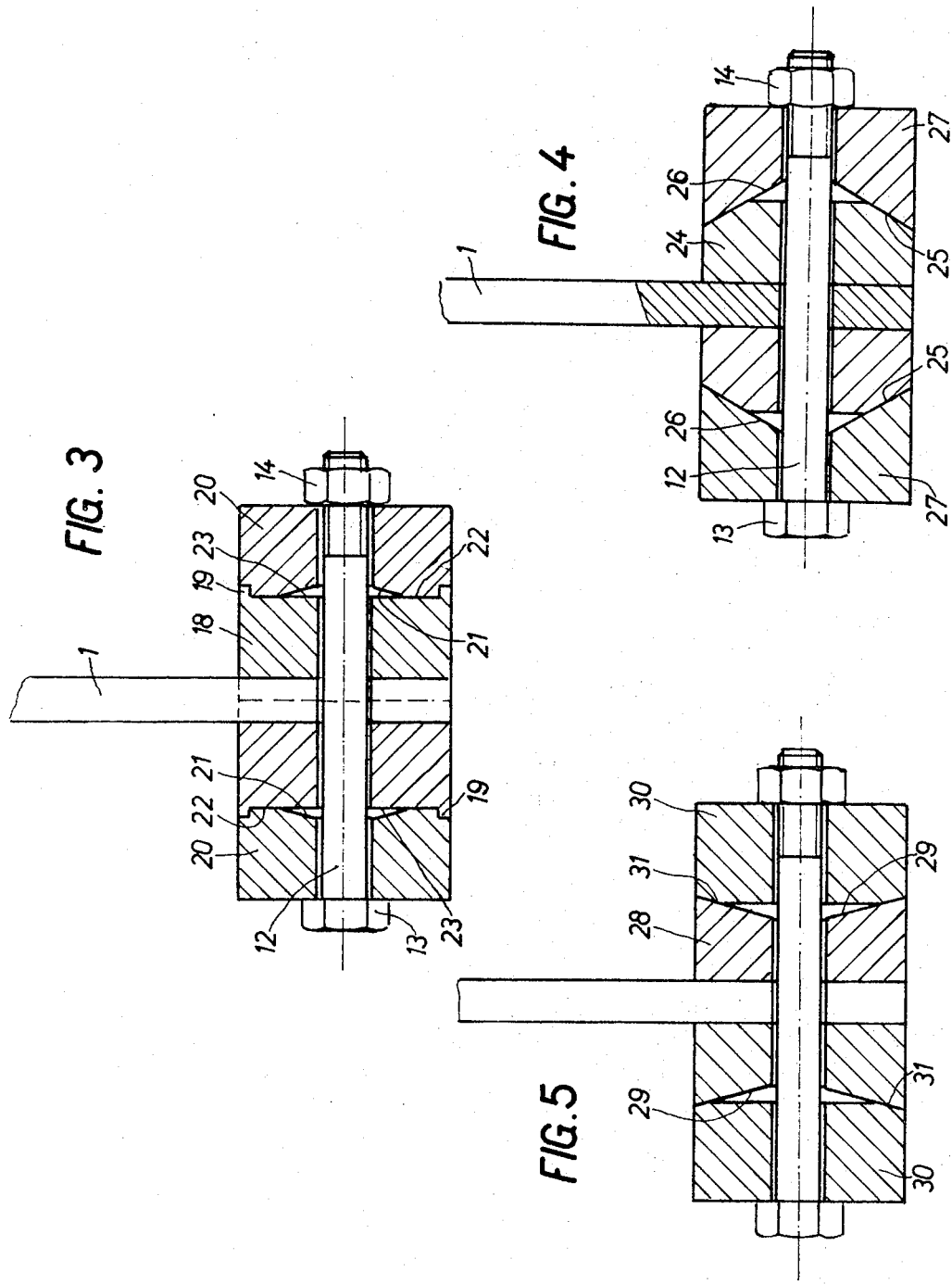

HEAD AND NECK REST

This application is a continuation in part application of Ser. No. 4346 filed Jan. 20, 1970, now U.S. Pat. No. 3,652,128.

The invention relates to a head and neck rest which is particularly suitable for automobile and airplane seats.

There are known constructions of head rests for automobile seats which have a ball-and-socket joint. In such a construction the ball is urged by a spring into an upwardly open spherical recess in the casing of the joint. A blocking of the joint is not provided. This construction provides comfort but no safety for the user. Safety would require that the heat rest can be so adjusted that upon shocks, particularly when a collision of cars occurs, the head rest affords a firm support up to certain limits, but beyond these limits it shall effectively yield.

Upon a collision of two cars driving in the same direction, the front car hit in the rear will be instantaneously accelerated. Thereby the head of an occupant of the front car is violently thrown backwards, the neck is subjected to a so-called whipping effect which often may cause dangerous injury.

It is an object of the present invention to provide a head and neck rest which can be arrested in its operative position, so that when it is used for automobile or airplane seats, it affords the required safety and effectively protects the head and the cervical vertebrae from injury. A shock shall not be hard to the neck, but shall be braked and absorbed with dissipation of kinetic energy.

According to the present invention, the head and neck rest comprises a head piece, a rod having a first end connected to the head piece fixed thereto for pivotal movement therewith and extending downward therefrom, supporting means for mounting said head piece rod to the back rest of a seat, coacting rotatably movable and stationary joint members rigidly connected to the supporting means for pivotally connecting said head piece rod to said supporting means, said movable joint member fixedly receiving a second end of said rod and centrally positioned between two stationary joint members and arranged to allow a tilting movement of the head piece rod, wherein said movable and stationary joint members are provided on the sides facing each other with cooperating annular surfaces, and a clamping rod traversing the joint members and connected to the stationary joint members for exerting a predetermined inward clamping force on said movable member by said stationary joint members and causing frictional engagement of said cooperating annular surfaces and clamping said movable member, rod and head piece to resist rotation in the stationary members.

The invention will now be described with reference to the drawings illustrating a preferred embodiment of the head and neck rest according to the invention.

FIG. 1 is a diagrammatic representation of the head and neck rest showing a partial sectional view according to the line I — I of FIG. 2, the movable and stationary joint members being mounted on a saddle destined to be placed over the top of a back rest of an automobile seat.

FIG. 2 is a vertical section taken along the line II — II of FIG. 1.

FIG. 3 is a sectional view, similar to FIG. 1, of a modified arrangement without showing the mounting saddle.

FIG. 4 is a sectional view similar to FIG. 1, of a further modification.

FIG. 5 is a sectional view similar to FIG. 1, of a still further modification of the head and neck rest according to the invention.

FIGS. 1 and 2 partially represent a head and neck rest adapted to be placed over the seat back of an automobile seat. The head piece A of the rest is connected by means of a rod 1 with a cylindrical, rotatable joint member 2 forming the movable part of an articulated joint. The rod 1 is fixed in the joint member 2. The fixed part of the joint is formed by two cylindrical disks 3. The sides of the disks 3 facing each other are provided each with a circular recess 4 which forms the two end surfaces of the disks each with an annular flange 5. The movable joint member 2 has its two opposite end faces recessed to form on each side an annular peripheral recess 6 into which recess the annular flanges 5 of the stationary joint members 3 snugly engage. The stationary joint members 3 are arranged in axial alignment with each other and the movable joint member 2, on a saddle 7 of the head rest, engaged over the top of an automobile seat 8, the common axis of the fixed disks 3 and the movable joint member 2 extending transversely to the longitudinal axis of the rod 1. The two stationary disks 3 are held against rotation on the saddle member 8, but are arranged to be able to effect a small axial movement with respect to the saddle member. For this purpose each disk 3 is provided with a slot 9 extending transversely across the disk 3 and a strap 10 is passed through each slot 9 and is attached with both ends to the saddle member 7 by means of rivets 11. The width of the strap 10 is slightly smaller than the length of the slots 9 to enable a small axial displacement of the disk 3.

The possibility of axial adjustment of the disks 3 allows to press the three parts of the joint, namely the movable joint member 2 and the two stationary disks 3 against each other by a predetermined force to produce a restraint or braking action of the pivotal movement of the rod 1 carrying the head rest A. For this purpose, clamping means are provided and consist of a clamping or screw bolt 12 axially traversing the members of the joint and the rod 1. The screw bolt is provided at one end with a screw head 13 bearing against the end face of one of the disks 3, and a clamping nut 14 bearing against the end face of the other disk 3. By tightening the nut 14 with a predetermined torque, the free end faces of the annular flanges 5 are applied with a corresponding force against the associated peripheral annular recesses 6 of the movable joint member 2. Thus the head rest A can be arrested in a preselected position which can be varied as desired. When a force is exerted on the head rest which exceeds the arresting force, as this may be caused by a violent shock of the head of a person using the seat when the automobile is hit from the back, the joint yields and the pivoting movement of the rod 1 towards the back in the direction of the force acting on the head rest is braked while energy is consumed owing to the frictionally engaged annular forces of the flanges 5 and recesses 6 which are close to the outer periphery of the joint members.

It is convenient to provide a locking means as an additional safety provision to prevent the rod 1 from effecting an undesired backwards pivoting movement beyond a determined angular position. FIG. 2 shows an example of such a locking means which comprises a bolt 15 engaged in a recess 16 of the movable joint member 2 and supported by a spring 17. The bolt 15 slightly projects beyond the cylindrical periphery of the member 2 and abuts against the upper edge of the saddle member 7. The bolt 15 and the saddle member 7, or at least the portion thereof where the bolt abuts against the saddle member preferably consist of a material which, when subjected to a violent shock, will deform while consuming or dissipating energy. In the last phase of movement of the head rest, produced by a violent shock, the rest is braked and the energy of shock is dissipated, that means that the head of a person using the seat does not strike against a rigid resistance. Modern automobiles are provided with rubber abutments in front of and behind the passenger compartment, in order that upon an accident, a large proportion of the energy of shock is dissipated by deformation of structural material. The same idea applies also in the present construction of the head rest.

The rod 1 only then can effect a further backwards rocking movement when the locking abutment of the bolt 15 against the saddle member 7 is released. The bolt may be pushed with the finger into the interior of the recess 16 of the joint member 2. The spring 17 takes care that the bolt 15 is again projected out of the recess 16 into its normal operative position. For reasons of safety it is important that the locking action occurs automatically as soon as the head rest is brought into its normal position of use.

As can be seen from FIG. 2 the head rest can tilt through an angle of about 90° towards the back or towards the front. Tilting towards the front will facilitate passengers to enter the car and occupy the back seats thereof.

The described construction offers the great advantage that arresting or braking the pivoting movement of the movable members of the joint, i.e. of the cylindrical joint member 2 and the rod 1, is effected by inner forces only, since the clamping rod 12 is supported on the joint itself. For this reason no forces result which would be transmitted outwardly to the saddle member 7 and to the back rest 8 of the seat and which would have to be absorbed by heavy bearing structures. Accordingly, arresting of the movable member 2 and of the rod 1, as well as of the head rest A fixed to the rod with respect to the saddle member 7 secured to the back rest of the seat, takes place by a flux of force through the members 2, 3, 12, 13 and 14, formed as rigid members, and an exactly adjustable and permanent arresting force will be obtained. Thus, the saddle member 7 can be made of light weight or sheet material.

FIG. 3 represents a vertical section through a modified joint structure only, the saddle member receiving the joint being not shown but is the same as that shown in FIGS. 1 and 2. The movable joint member 18 is again of cylindrical cross section and provided with two plane end faces 23, each having formed thereon a peripheral flange 19. The rod 1 carrying the head rest is engaged in the movable joint member 18. The fixed or stationary joint members 20 are cylindrical disks having their sides facing each other provided with recesses 21 and with an annular plane surface 22 which engages the opposite plane end surface 23 of the movable joint member 18. The clamping rod 12 provided with a bolt head 13 and a screw nut 14 is adapted to axially exert compressive stress on the three joint members, so that the annular plane faces 22 of the two fixed joint members 20 frictionally engage the corresponding opposite plane faces of the movable joint member 18. This joint structure is placed in the trough-shaped channel (not shown) of the saddle member as shown in FIG. 1, and the two joint members 20 are fixed to the saddle member by means of straps as shown in FIG. 1 or by any other convenient holding means.

The described joint structure operates in the same manner as that described with reference to FIGS. 1 and 2. When a violent shock is caused to be exerted by the head of a person using the seat equipped by the head rest, which shock exceeds the arresting force exerted by the clamping means, the joint yields, and the pivoting movement of the rod 1 towards the back is braked while energy is consumed owing to the frictional engagement of the surfaces 22 and 23 of the fixed and movable joint members, respectively.

In the modified joint structure of FIG. 4 the movable joint member 24 is again of cylindrical cross section, while in longitudinal section it has the shape of an octogon with leveled edges forming two opposite annular conical surfaces 25 which cooperate with correspondingly tapering conical surfaces 26 of the fixed or stationary joint members 27. The rod 1 carrying the head rest (not shown) is secured to the movable joint member 24.

The clamping bolt 12 with the head 13 and nut 14 serve to arrest the head rest carrying rod 1 in the desired position. When tightening the nut 14, the conical surfaces 26 of the two stationary joint members 27 are applied against the annular conical surfaces 25 of the movable joint member 24 to hold the rod 1 in the adjusted position, but when a force is exerted on the head rest which exceeds the arresting force, the joint yields and the rod 1 effects a backwards pivoting movement which is braked while energy is consumed between the frictionally engaged surfaces of the movable and stationary joint members.

In the modification of FIG. 5, the movable, cylindrical joint member 28 to which the head rest carrying rod 1 is attached, is formed as a double cone provided with two inwardly tapering conical surfaces 29. The stationary joint members 30 which are also cylindrical, have their sides facing the movable member each provided with an annular bevelled edge 31 forming a conical surface adapted to cooperate and frictionally engage the correspondingly tapering conical surface 29 of the movable joint member 28 close to the outer circumference of the joint.

In all modifications disclosed in FIGS. 3, 4 and 5, the movable joint members 18, 24 or 28 is also provided with a locking bolt cooperating with the saddle member to form a blocking device comprising energy dissipating destruction members.

I claim:

1. A head and neck rest, particularly for automobile or airplane seats having a back rest, comprising a supporting means fixed to the back rest, two stationary joint members fixed to the supporting means, a rotatably movable joint member positioned between the two stationary joint members for pivotal movement relative thereto, said movable and stationary joint members having, on the sides facing each other, cooperating annular surfaces frictionally engaging each other for dissipating kinetic energy, a rod having a first and a second end, the first end fixedly received in the rotatably movable joint member for pivotal movement therewith, a head piece connected to the second end of the rod for movement therewith, and a clamping rod axially traversing the movable and stationary joint members for exerting a predetermined inward clamping force on said movable member thereby causing the movable member, rod and head piece to frictionally resist rotation relative to the stationary members.

2. A head and neck rest according to claim 1 in which a blocking device extends outward from the movable member for limiting the pivotal movement of the rod and head piece by engaging the supporting means.

3. A head and neck rest according to claim 2 in which the blocking device comprises an energy dissipating destruction device.

4. A head and neck rest according to claim 2 in which the blocking device is movable into the movable member whereby the device may be rendered inoperative.

5. A head and neck rest according to claim 2, in which the blocking device which extends outwardly from the movable member comprises a spring loaded bolt coacting with said supporting means for limiting the pivotal movement of said head piece rod.

6. A head and neck rest according to claim 1 wherein the movable member is of cylindrical cross section and provided with two plane end faces each face having a peripheral flange, and wherein the sides of the stationary joint members facing the movable joint member have an annular plane surface and a recess contiguous with the peripheral flange of the movable member.

7. A head and neck rest according to claim 1 wherein the movable member is of cylindrical cross section and provided with two inwardly tapering conical end faces, and wherein the sides of the stationary joint members facing the movable joint member have an annular bevelled edge forming a conical surface contiguous with the conical end faces.

8. A head and neck rest according to claim 1, wherein said movable member is a truncated double cone, the sides of the stationary joint members facing the double cone being provided with correspondingly conical annular surfaces applied against the conical faces of the movable joint member by said clamping rod.

* * * * *